US008881163B2

(12) United States Patent
Hoeven et al.

(10) Patent No.: US 8,881,163 B2
(45) Date of Patent: Nov. 4, 2014

(54) KERNEL PROCESSOR GROUPING

(75) Inventors: Arie Van der Hoeven, Redmond, WA (US); Ellsworth D. Walker, Seattle, WA (US); Forrest C. Foltz, Woodinville, WA (US); Zhong Deng, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1459 days.

(21) Appl. No.: 11/952,828

(22) Filed: Dec. 7, 2007

(65) Prior Publication Data

US 2009/0150650 A1 Jun. 11, 2009

(51) Int. Cl.
*G06F 9/46* (2006.01)
*G06F 15/00* (2006.01)
*G06F 9/50* (2006.01)
*G06F 9/48* (2006.01)

(52) U.S. Cl.
CPC ............ *G06F 9/5066* (2013.01); *G06F 9/5083* (2013.01); *G06F 9/4881* (2013.01)
USPC .............................. 718/104; 718/102; 712/28

(58) Field of Classification Search
CPC .... G06F 9/5066; G06F 9/5083; G06F 9/4881
USPC ..................................... 718/104, 102; 712/28
See application file for complete search history.

(56) References Cited

U.S. PATENT DOCUMENTS

| | | | |
|---|---|---|---|
| 5,109,510 A | 4/1992 | Baker et al. | |
| 5,307,495 A | 4/1994 | Seino et al. | |
| 5,872,963 A * | 2/1999 | Bitar et al. | 712/233 |
| 6,332,180 B1 | 12/2001 | Kauffman et al. | |
| 6,658,448 B1 | 12/2003 | Stefaniak et al. | |
| 6,901,522 B2 * | 5/2005 | Buch | 713/320 |
| 6,957,435 B2 | 10/2005 | Armstrong et al. | |
| 6,986,137 B1 | 1/2006 | King et al. | |
| 6,993,762 B1 | 1/2006 | Pierre | |
| 7,028,218 B2 | 4/2006 | Schwarm et al. | |
| 7,111,188 B2 * | 9/2006 | Mukherjee | 714/1 |
| 2003/0046512 A1 | 3/2003 | Ioki et al. | |
| 2003/0088608 A1 | 5/2003 | McDonald | |
| 2004/0019891 A1 * | 1/2004 | Koenen | 718/102 |

(Continued)

FOREIGN PATENT DOCUMENTS

| | | |
|---|---|---|
| EP | 1674987 | 6/2006 |
| JP | 2004302837 A | 10/2004 |

OTHER PUBLICATIONS

Fulton, "Critical Features Cut from Windows Server Virtualization", at <<w.betanews.com/article/Critical_Features_Cut_from_Windows_Server_Virtualization/1178824664>>, BetaNews, Inc., May 10, 2007, pp. 8.

(Continued)

*Primary Examiner* — Camquy Truong
(74) *Attorney, Agent, or Firm* — John Jardine; Kate Drakos; Micky Minhas

(57) ABSTRACT

Techniques for grouping individual processors into assignment entities are discussed. Statically grouping processors may permit threads to be assigned on a group basis. In this manner, the burden of scheduling threads for processing may be minimized, while the processor within the assignment entity may be selected based on the physical locality of the individual processors within the group. The groupings may permit a system to scale to meet the processing demands of various applications.

20 Claims, 2 Drawing Sheets

(56) References Cited

U.S. PATENT DOCUMENTS

| | | | |
|---|---|---|---|
| 2004/0103264 A1* | 5/2004 | Fujii et al. | 712/15 |
| 2005/0081201 A1 | 4/2005 | Aguilar, Jr. et al. | |
| 2005/0120160 A1 | 6/2005 | Plouffe et al. | |
| 2005/0149603 A1 | 7/2005 | DeSota et al. | |
| 2007/0039002 A1* | 2/2007 | McDonald | 718/102 |
| 2009/0187628 A1* | 7/2009 | DeSota et al. | 709/205 |

OTHER PUBLICATIONS

Morgan, "Update Makes Red Hat Enterprise Linux 4 More Scalable", at <<.itjungle.com/tlb/tlb032106-story01.html >>, vol. 3, No. 11, Mar. 21, 2006, pp.

Nieplocha, et al., "Exploiting Processor Groups to Extend Scalability of the GA Shared Memory Programming Model", at <w.emsl.pnl.gov/docs/global/papers/groups.pdf>>, ACM, 2005, pp. 262.

PCT Intl Search Report and Written Opinion for Application No. PCT/US2008/083530, dated Jun. 11, 2009, 11 pgs.

Extended European Search Report mailed Oct. 24, 2011 for European patent application No. 08859036.9, 11 pages.

Microsoft, "Application Software Considerations for NUMA-Based Systems", Internet Citation, Mar. 5, 2003, retrieved from the internet at microsoft.http://msdn.microsoft.com/en-us/windows/hardware/gg463257, retrieved on Aug. 15, 2005, pp. 1-8.

European Office Action mailed Oct. 18, 2012 for European patent application No. 08859036.9, a counterpart foreign application of U.S. Appl. No. 11/952,828, 10 pages.

"Kernel Enhancements for Windows Vista and Windows Server 2008", Jul. 28, 2006, pp. 1-15, retrieved from the internet on Oct. 12, 2012 at msdn.microsoft.com/en-us/library/windows/hardware/gg463415.aspx.

Chinese Office Action mailed Dec. 5, 2012 for Chinese patent application No. 200880119662.3, a counterpart foreign application of U.S. Appl. No. 11/952,828, 6 pages.

Chinese Office Action mailed Jul. 27, 2012 for Chinese patent application No. 200880119662.3, a counterpart foreign application of U.S. Appl. No. 11/952,828, 13 pages.

European Office Action mailed Sep. 18, 2013 for European patent application No. 08859036.9, a counterpart foreign application of U.S. Appl. No. 11/952,828, 15 pages.

Taiwan Office Action mailed Jan. 18, 2014 for Taiwan patent application No. 97143884, a counterpart foreign application of U.S. Appl. No. 11/952,828, 9 pages.

European Office Action mailed Jan. 20, 2014, for European patent application No. 08859036.9, a counterpart foreign application of U.S. Appl. No. 11/952,828, 17 pages.

* cited by examiner

KERNEL PROCESSOR GROUPING

BACKGROUND

As the number of processors in systems increase, the overall productivity of the processors may not match the system's expected processing capacity when processing applications which were designed to be on a system having less processors. For instance, bottlenecks may occur as individual threads for processing are distributed to the various processors. In other instances, some applications may limit the number of processors which may effectively process tasks for the application. For example, some applications may not be well suited for being processed by more processors that for which the application was designed. For example, while an application may operate as expected on a desktop system including two processors, an enterprise server having sixty-four or more processors may experience issues with the same application.

SUMMARY

Techniques for grouping individual processors into assignment entities are discussed. Statically grouping processors may permit threads to be assigned on a group basis. In this manner, the burden of scheduling threads for processing may be minimized, while the processor within the assignment entity may be selected based on the physical locality of the individual processors within the group. The groupings may permit a system to scale to meet the processing demands of various applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described which may provide kernel level processor grouping. For instance, individual processors may be statically configured into kernel level groupings based on the locality of the individual processors so that threads or discrete application tasks for processing may be scheduled and processed on a per group basis. Grouping may permit the OS to interact on a group basis rather than interacting with individual processors. As a result, the OS may be simplified in comparison to an operating system which distributes processing tasks on per processor basis. The individual threads may be assigned to a kernel group for processing. Statically grouping processors, and assigning processing tasks on a per group basis, may minimize the burden associated with scheduling individual processors in systems including a large number of processors. For example, a enterprise server having one hundred twenty eight processors may be configured to handle several applications which were designed to operate effectively in a two processor desktop type system.

For applications which may experience synchronization or correctness issues, if processing is carried out by more processors than was anticipated for processing the application, the threads associated with the application may be processed in a single kernel grouping so that processing may be isolated (e.g., occur as if the processors in the kernel group were the only processors in the system). In this manner, a first kernel group may service a first application while other applications, if applicable, may be processed by other kernel groups. The static processor grouping may promote efficient processing of applications which were designed for processing on a limited number of processors, while supporting overall scalability for the applications running on the computing system.

Exemplary Environment

Figure 1:
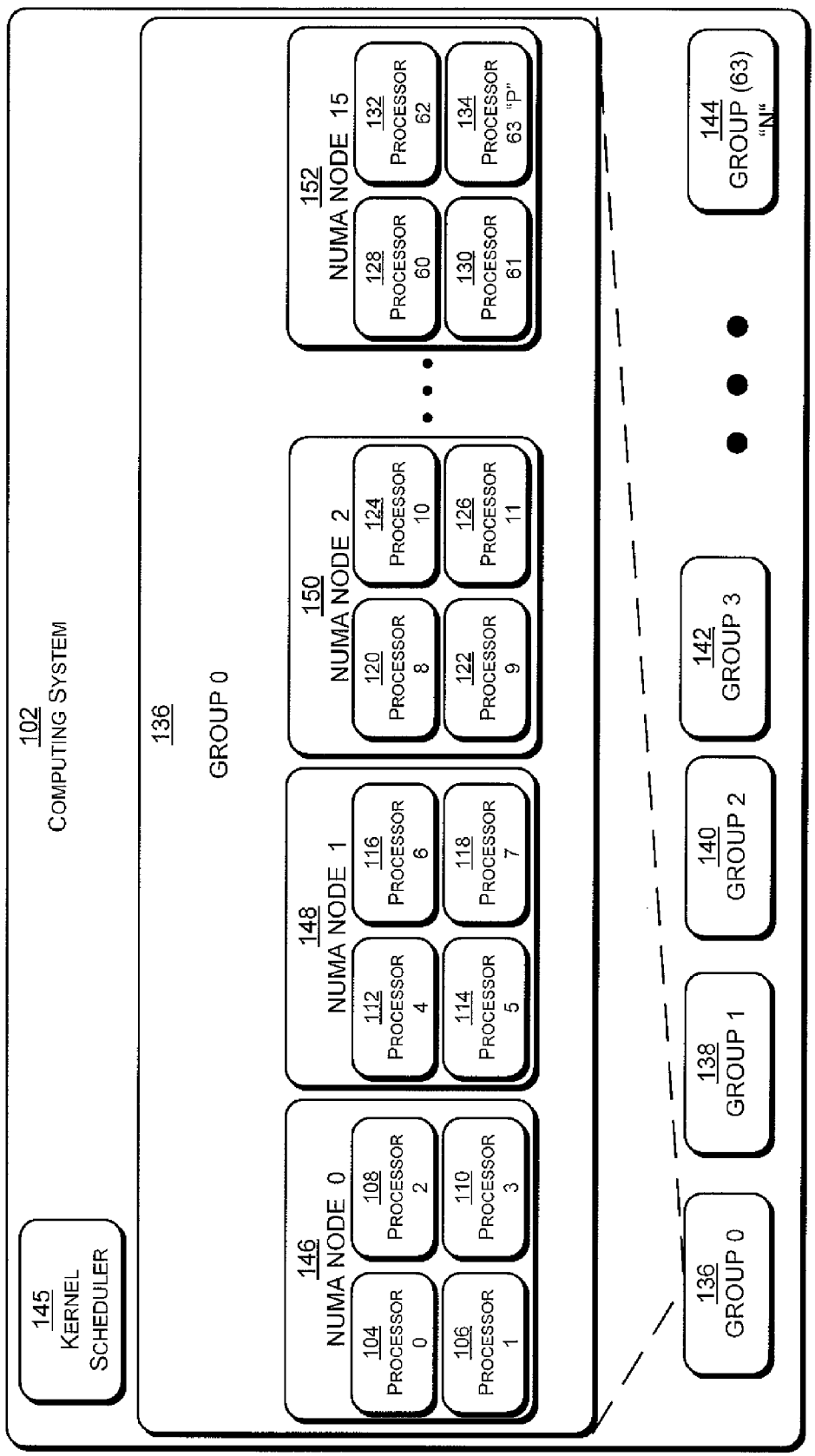
FIG. 1 illustrates an environment in exemplary implementations that may use kernel level group processing.

FIG. 1 illustrates an environment 100 in exemplary implementations that permits kernel grouping. For example, a computing system 102 having sixty four or more processors (104-134 will be referenced) may be configured so that the processors are configured into groups (GROUPS "0-N" will be referenced, respectively 136-144) on the kernel level. An OS operating on the computing system may be configured on the kernel level to cause threads or discrete tasks to be processed on particular group of processors, in the computing system. Kernel level processor grouping may relieve applications or other level from having to account for the number of processor included in the system while considering the physical locality of the individual processors. This is to say, that by accounting for multiple processor on the kernel level, issues associated with conducting processing on numerous processors, in comparison to that for which an application was configured, may be minimized. For example, software application modules may be isolated or otherwise partitioned to make use of the available processing resources. As a result, applications which are not readily scaleable may be processed without overly consuming computing system resources in comparison to an anticipated processor use. For instance, an application may consume more processing capacity when processed on large number of processors in comparison to the same application when run on the number of processors for which the application was designed. Performing operations on a per-group basis may minimize scheduling burden on the OS when distributing threads for processing. For example, by distributing individual threads to a kernel group for processing, the burden on a kernel scheduler 145 may minimized in comparison to distributing tasks to individual processors. For instance, minimizing the number of kernel group in the computing system may allow the kernel scheduler 145 to implement a relatively simpler, and potentially faster, algorithm.

While physical embodiments are discussed, virtualized implementations are contemplated as well. For example, applications may be run in a virtual environment, or in a combined environment, and so on. For example, an application may be executed in a virtual environment on a computing system which is physically partitioned as well.

Although, a 64 (sixty-four) processor computing system is referenced, the techniques and principles discussed herein may be scaled, such as for "P" processors (such as in a particular GROUP) and "N" kernel groups (including "P", individual processors), as desired based on computing system resources, such as a one hundred twenty eight processor system, hardware/software, and so on. For example, the sixty-four processors or more processors may be configured into "N" kernel level groupings with individual kernel groupings having "P" processors. In implementations, a kernel group may include a single processor, two processor and so on. In another example, a sixty-four processor system may be configured as a single group as a sixty-four bit bitmask may effectively address the grouping. In further examples, a system having sixty-four or more processors may be configured into approximately sixty-four processor per group.

The precise number of kernel groups and individual processors within individual kernel groups may vary. For example, processors may be hot-swapped into groups as desired, and so on. For example, while a computing system may include sixty-four or more physical processors, some groups may be dedicated to specific tasks, or processors may be reserved for subsequent group assignment and so on. The burden of scheduling tasks may be limited by minimizing the number of kernel groups. For example, the number of individual processors within a group may be selected based on the number of processors an applications is designed to be processed on. In this manner, a computing system may support applications which do not lend themselves to processing by a larger number of processors. For example, a kernel group may include two processors if an application, which is expected to be routinely process, may make efficient use of two processors. This is to say, the number of individual processors in a kernel group may be assigned based on application parameters or for applications which are expected to be processed. For instance, if an enterprise server is anticipated to run at least one application which was designed for processing on four processors, four processors may be statically assigned to a kernel group so that additional processors beyond that which may be used effectively are not included in the kernel group.

Other considerations may include, grouping a sufficient number of processors together in order to efficiently process a thread. In addition to scheduling application threads to dedicated groups, the kernel scheduler 145 may assign tasks on a round-robin basis as kernel groups become available for processing.

Individual processors within kernel groups may be selected based on the locality of the processor with respect to the other processors within the kernel group. In implementations, individual processors within non-uniform memory access (NUMA) nodes may be included in kernel groups. For example, one or more individual processors assigned to a local memory node may be included in a kernel group. As a result, the processors within the NUMA node may have efficient access to local memory resources when processing a thread assigned to the kernel group which includes the processors in the NUMS node. In-turn, the processors included in the NUMA nodes (for reference NUMA nodes 0-15, respectively 146-152) may be assigned to particular kernel groupings. Including locality adjacent processors within a kernel grouping, whether in the same NUMA node or not, may improve overall processing while various portions of the system are used by different applications. Other factors for deciding groupings may be used in conjunction with locality or may be implemented, such processing core configurations or other factors as desired. For example, a kernel grouping configuration may be based on the configuration of a processing core and the core's socket configuration.

Kernel level processor grouping may prevent erratic application performance, correctness issues, synchronization issues and so on for computing systems having large numbers of processors, in comparison to a low processor system for which an application was designed. In instances, a computing system having a large number of processors (such as one hundred and twenty-eight) may potentially experience the above issues, while a lower resource system running the same application may not. Grouping the processor according to the techniques herein may cause the application and/or the system to effectively minimize the potential for erratic behavior.

In implementations, the number of processors within a kernel may permit a common bitmask of a designated size to be used. For example, a sixty-four bit bitmask may be managed in an efficient manner, while accommodating the grouped processor configuration. Other exemplary situations may implement a 32-bit bitmask (thirty-two bit bitmask) configuration.

By using kernel groupings, OS assigned threads available for processing, may make efficient use of computing system resources thereby avoiding potential issues which may occur in server having large numbers of processors. In a large scale processor system, a kernel scheduler 145 may assign individual application threads for processing to particular kernel groups so that multiple application, which are suited to a lesser number of processors than what are included in the system, may be processed in a generally contemporaneous manner thereby making more efficient used of the system's processor than if the processors were handled on an individual basis.

If a particular application has synchronization, correctness or other multiple processor issues (if executed on a computing system with multiple processors), the kernel scheduler 145 may schedule the application's threads to a single group to avoid or minimize these potential issues. For example, if an application is not readily scalable, the kernel scheduler 145 may direct the application's processing task to a single group. For example, if a computer system having sixty-four or more processors is to process a task which is multiple processor sensitive, the kernel scheduler 145 may direct the application threads to GROUP 0 (zero) which may isolate the application. In this manner, the threads may be processed as if the processors in the group were the system's processing resources. The level of isolation may vary from a physical or virtual partition type isolation to lesser forms of isolation as desired.

In contrast, if an application is configured for multiple processor processing, threads for processing may be individually scheduled for processing among GROUP 1, GROUP 2 and GROUP 3, (which individually may include multiple processor akin to the configuration of GROUP 0) to take advantage of the computing system's processor resources.

In implementations, applications and drivers may be given visibility to the entire system. For example, a driver may be made aware of the kernel level structure so that the driver may support a component having access to the system. In this manner, the computing system may obtain group processing benefits while applications and drivers may be made aware of the systems processor groupings.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., tangible memory and so on.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 2:
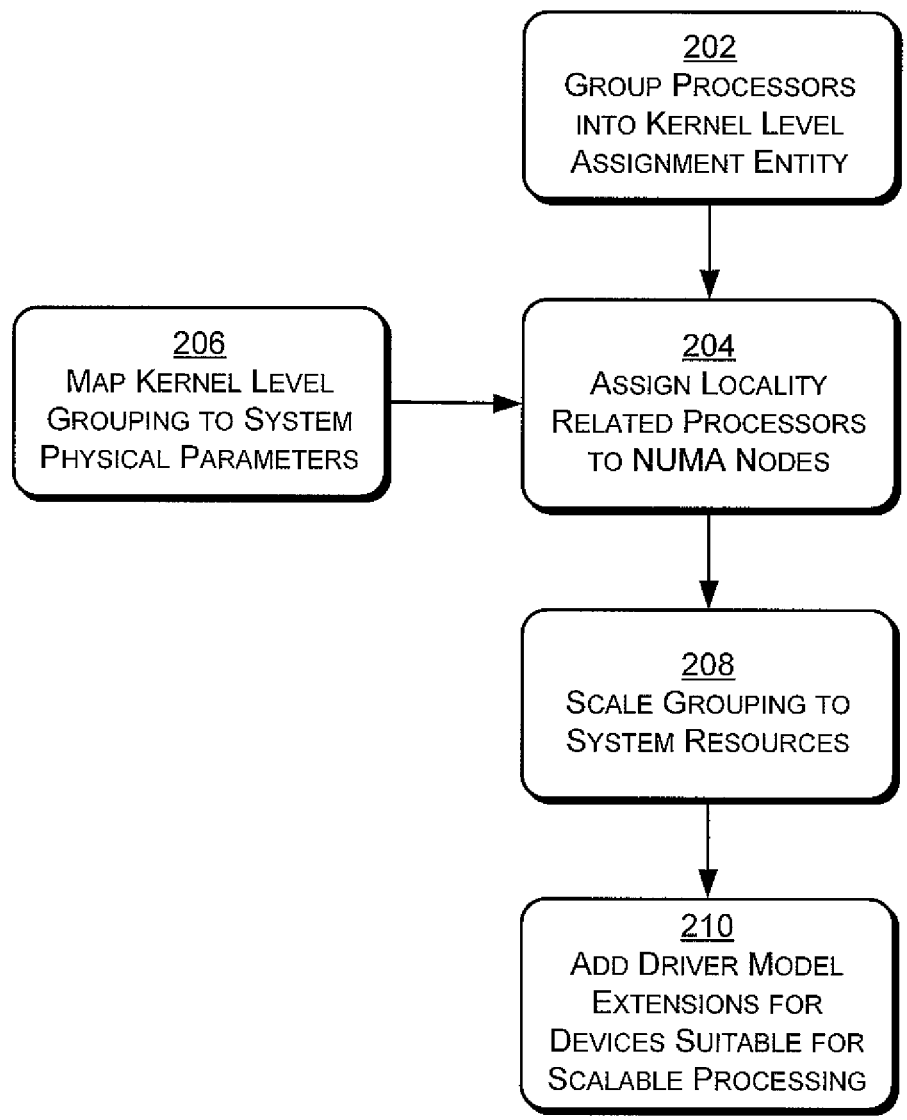
FIG. 2 is a flow diagram depicting a procedure in exemplary implementations in which processor assignment entity static grouping is used.

FIG. 2 discloses exemplary procedures for statically grouping processors. For example, a computing system's OS kernel level may be configured to group individual processor so applications which may be sensitive to large scale processor environments may be processed.

The techniques discussed herein may permit processing of threads assigned by the OS in an isolated manner on a group basis. These techniques may minimize the overall complexity of the OS as processing may be consider on a group basis rather than parsing out tasks on a individual processor basis.

For application designed for large scale processing the individual groups may isolate the individual task in one assignment entity from other assignment entities within computing system.

The individual processor may be grouped 202 into an assignment entity for processing threads. For example, the kernel scheduler may assign a particular application to processors statically grouped at startup. For example, threads from a first application may be scheduled to a first assignment entity, while other application tasks are assigned to a second assignment entity and so on. For example, a first application may be assigned to a first static kernel grouping of two processors, which may be physically local to the other processor included in the group, while a second application is assigned to a second static kernel group having four processors. The foregoing may permit the first and second applications to be processed more efficiently (make more efficient use of the processors) than if the OS interacted with the processors on an individual basis.

In implementations, the number of processors included in an assignment entity may be commensurate with the number of processor for which an application was configured. In this way, processing resources may not be dedicated to a particular application which may not be able to make effective use of the number of processors assigned to the group. Other assignment entities may be similarly configured so that the individual groups may be assigned tasks individually from different applications.

The number of processors included in an assignment entity may be determined based on the bitmask used in conjunction with the processors. Thus, the number of processors within a group may be, for example, sixty-four or less in order to make use of a sixty-four bit bitmask. In this manner, the system may use lower bit bitmask configuration, which may be of a simpler configuration, while accommodating a system having a processors beyond that which the bitmask may effectively address. In instances, the number of processors assigned into processing groups may be less than that of the bitmask as some processor may be withheld hot-swapping and so on.

Using a grouped processor configuration (on the kernel level) may minimize the impact of a multi-processor environment on applications executing at a higher level. Thus, while the kernel level may be configured for controlling multiple processors as a entity, such as in a real environment, a virtualized environment or a combination thereof, a lower bit bitmask configuration may be used without having to reconfigure the bitmask for the additional processors beyond that for which the bitmask is configured.

In implementations, the number of assignment entities within an OS/computing system may be minimized in order to minimize the scheduling burden associated with dispersing application tasks (e.g., potential bottlenecks). This may permit kernel level scheduling using simpler algorithms in comparison to a system which individually addresses the processors. The precise number of assignment entities and the number of individual processors within the assignment entities may be based on a number of factors including the expected application processing demands, the number of processors which may be implemented with an application before the application experiences processing issues, minimize scaling bottlenecks and so on.

Individual processors may be included in a particular assignment entity to maximize the locality of the processors within the assignment entity. For example, the processors within an assignment entity may be physically adjacent to the other individual processors within the assignment entity.

The individual processors within a non-uniform memory access node (NUMA) node may be grouped into an assignment entity. Thus, individual processors assigned 204 in a NUMA node may be grouped into a particular kernel level processor group. In the previous manner, the individual processors included in the assignment entity and the NUMA node may have rapid access the local memory (in comparison to individual processors in which the preceding does not apply). While NUMA nodes may not be not tied to particular kernel groups, in implementations nodes may be mapped 206 to kernel groups in order to closely affinitize specific tasks. For example, an application program interface may be configured to tie individual physical processors with the kernel groupings. Closely mapping physical resources with the kernel level assignment entities may permit assigning closely associated tasks to particular kernel groupings for processing.

For applications suitable for scaling 208, the kernel scheduler may assign the threads as desired. For applications designed for a limited number of processors, the threads may be directed to a single kernel group. For example, an application may have its processing tasks directed to GROUP 0, while other application may be directed to GROUP 1.

Applications and drivers may be given visibility to the system's grouping. For example, a driver may be made aware of the kernel level grouping structure so that the driver may support a component having access to the overall system. In this manner, a computing system operating in conformance with the techniques discussed herein may obtain group processing benefits while applications and drivers may be made aware of the systems processor groupings as desired.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
arranging individual processors into a plurality of non-uniform memory access (NUMA) nodes;
statically grouping two or more NUMA nodes of the plurality of NUMA nodes on a kernel level into one or more assignment entities, the two or more NUMA nodes being grouped based at least on (i) a physical locality of the individual processors with respect to other individual processors within a particular assignment entity of the one or more assignment entities and (ii) a number of processors an application is designed to be processed on; and
scaling the one or more assignment entities to handle individual threads of the application so that the individual threads are assigned on a per assignment entity basis.

2. The method of claim 1, wherein at least one of the one or more assignment entities is configured to isolate the individual threads of the application within the at least one of the one or more assignment entities.

3. The method of claim 1, wherein a single individual thread of the individual threads is assigned to a single assignment entity of the one or more assignment entities at a time.

4. The method of claim 1, wherein the individual processors are arranged into the plurality of NUMA nodes at start-up.

5. The method of claim 1, further comprising:
partially populating a non-uniform memory access (NUMA) node at start-up to permit hot-adding of processors.

6. The method of claim 1, wherein the individual threads of the application are processed in a single assignment entity of the one or more assignment entities.

7. One or more hardware computer-readable media comprising computer-executable instructions that, when executed, direct a computing system to:
assign locality related individual processors to a plurality of non-uniform memory access (NUMA) nodes; and
group two or more NUMA nodes of the plurality of NUMA nodes statically at startup on a kernel level into a kernel group which is configured to process an individual thread of an application at a time, the kernel group comprising a particular number of processors that the application is designed to be processed on.

8. The one or more hardware computer-readable media of claim 7, wherein the computer-executable instructions further direct the computing system to:
schedule the individual thread on a per kernel group basis.

9. The one or more hardware computer-readable media of claim 7, wherein threads of the application are all scheduled to a single kernel group for processing.

10. The one or more hardware computer-readable media of claim 7, wherein the computer-executable instructions further direct the computing system to:
add driver model extensions for hardware configured for scalable processing.

11. The one or more hardware computer-readable media of claim 7, wherein the computer-executable instructions further direct the computing system to:
scale additional kernel groups for processing threads from applications supporting distributing of threads among different kernel groups.

12. The one or more hardware computer-readable media of claim 7, wherein individual processors in the kernel group are isolated from processors outside the kernel group.

13. The one or more hardware computer-readable media of claim 12, wherein the isolation comprises physical or virtual partition isolation.

14. The one or more hardware computer-readable media of claim 7, wherein the kernel group includes approximately sixty-four individual processors.

15. The one or more computer-readable media of claim 7, wherein the particular number of processors that the application is designed to be processed on is specified by an application parameter associated with the application.

16. The one or more computer-readable media of claim 7, wherein the computer-executable instructions further direct the computing system to:
determine a number of processors that the application is designed to be processed on; and
based on the determining, group the two or more NUMA nodes statically at the startup on the kernel level into the kernel group which is configured to process an individual thread of the application at the time, the kernel group comprising the particular number of processors that the application is designed to be processed on.

17. A system comprising:
a plurality of processors, statically configured on a kernel level in a kernel group based at least on a number of processors an application is designed to be processed on, the plurality of processors being physically local to each other and configured into a plurality of non-uniform memory access (NUMA) nodes within the kernel group; and
one or more components configured to assign individual threads of the application on a kernel group basis.

18. The system of claim 17, further comprising:
a kernel scheduler configured to distribute the individual threads on a kernel group basis.

19. The system of claim 18, wherein the kernel scheduler assigns all threads for the application to a single kernel group.

20. The system of claim 17, wherein the plurality of processors are assigned to a kernel group upon starting up the system.

* * * * *